United States Patent [19]
Kai et al.

[11] Patent Number: 5,748,994
[45] Date of Patent: May 5, 1998

[54] OPTICAL DEVICE WITH AN IMAGE BLUR SUPPRESSION FUNCTION

[75] Inventors: Tadao Kai, Kawasaki; Nobuhiko Terui, Ichikawa; Shinichi Tsukada, Toride, all of Japan

[73] Assignee: Nikon Corporation, Tokyo, Japan

[21] Appl. No.: 638,752

[22] Filed: Apr. 29, 1996

[30] Foreign Application Priority Data

Apr. 28, 1995 [JP] Japan .................. 7-106106
Apr. 19, 1996 [JP] Japan .................. 8-098317

[51] Int. Cl.⁶ .................. G03B 17/00; G03B 3/00
[52] U.S. Cl. .................. 396/55; 396/91
[58] Field of Search .................. 396/52–55, 91; 348/208; 359/554, 555, 556, 557

[56] References Cited

U.S. PATENT DOCUMENTS 5,107,293  4/1992  Sekine et al. .................. 354/430

FOREIGN PATENT DOCUMENTS 62-47013  2/1987  Japan .

*Primary Examiner*—Safet Metjahic
*Assistant Examiner*—Eric Nelson

[57] ABSTRACT

An optical device, such as a camera, which includes an image blur suppression optical system to optically prevent image blur of a photographic image on an image plane of the optical device by changes in at least a portion of a photographic optical system. An image blur suppression drive unit drives the image blur suppression optical system, and a suppression position detection unit detects changes in the position of the image blur suppression optical system during the time of the image blur suppression. A lens prime and a memory unit generates constants indicative of optical conditions in the optical device which correspond to changes in the position of the image blur suppression optical system.

24 Claims, 9 Drawing Sheets

OPTICAL DEVICE WITH AN IMAGE BLUR SUPPRESSION FUNCTION

BACKGROUND OF THE INVENTION

1. Field of the Invention

The present invention relates to an optical device which has a function of preventing image blur which originates from hand tremor and other movements of the optical device, and more particularly, to an optical device such as a camera having an image blur suppression device and which undergoes changes in optical conditions accompanying changes in the image blur suppression device, the optical device allows having a device to compensate for those changes.

2. Description of the Related Art

Image blur suppression devices have as their object, suppression of, or reduction of, blurring in an image projected onto an image plane of an optical device. Motion is typically imparted to an optical system by way of vibrations in the optical system, or in the surrounding holding member. In general, known image blur suppression devices cause a compensation (suppression) lens to shift counter to the motion of the optical system so as to shift the image projected by the optical system relative to the optical system.

Heretofore, an optical device using an image blur suppression optical system which is movable parallel to the optical axis, has been proposed with the object of compensating for image blur of a picture image on an image plane of the optical device. In the case of still cameras, it is known to perform image blur suppression even outside the shutter release time and focusing time, as disclosed in Japanese Laid-Open Patent Publication JP-A-62-47013.

However, with the aforementioned conventional optical device having an image blur suppression function and which uses a focus detection device of a through the lens (TTL) split pupil type, as in the above-mentioned Japanese Laid-Open Patent Publication JP-A-62-47013, in the case that an image blur suppression drive is performed during focus detection, because a displacement occurs between the optical axes of the photographic optical system and the focus detection optical system, an alteration occurs of the focus detection value (defocus detection value) due to an aberration of the photographic optical system.

Accordingly, for example, in the case of still cameras, it is a problem that the accuracy of focusing of the photographic lens is decreased, and photographs are taken which are of poor quality.

And in the case of performing TTL photometry, because the optical axis of the photographic optical system and the photometric optical system are displaced between the viewfinder screen, from the directionality of the diffusion of the viewfinder screen, alterations occur in the photometric value. As a result, the accuracy of the photometry of the camera decreases. Because of this occurrence, there is the problem that photographs of poor quality are taken.

SUMMARY OF THE INVENTION

Accordingly, it is an object of the present invention to provide an optical device having an image blur suppression optical system for suppressing image blur of an image on a picture plane of the optical device, and more particularly, to provide an optical device having an image blur suppression optical system, wherein the optical device can compensate for optical changes of the image blur suppression optical system during suppression of the image blur.

Another object of the present invention is to provide an optical device having an image blur suppression optical system which prevents the above-mentioned worsening of the accuracy of photometric values for taking a photograph.

Additional objects and advantages of the invention will be set forth in part in the description which follows and, in part, will be obvious from the description, or may be learned by practice of the invention.

To solve the aforementioned problems and to achieve the foregoing and other objects, an optical device is provided which includes an image blur suppression optical system which optically suppresses image blur of a photographic image on an image plane of the optical device, by changing a portion or all of a photographic optical system for imaging the photographic image on the image plane, a suppression drive unit which drives the image blur suppression optical system to perform the suppression, a suppression detection unit which detects changes of the image blur suppression optical system at the time of suppression, and a constant generation unit which causes generation of constants representative of changes of optical conditions accompanying changes of the suppression optical system, based on the output of the image blur suppression detection unit.

The optical device further includes a data detection unit which detects data that has passed through the photographic optical system, and the constant generating unit generates constants which affect and compensate the detection data of the data detection unit.

The optical device also includes a focus detection unit which detects the focus state of a subject image which has passed through the photographic optical system. In turn, the constant generation unit causes the generation of constants which correct the focus state detection of the focus detection unit.

A constant memory unit stores constants which represent changes of optical conditions accompanying changes of the image blur suppression optical system. The constant generation unit selects constants which have differed from among the stored values of the constant memory unit, based on the output of the image blur suppression detection unit.

Another memory unit stores plural constants which represent changes of optical conditions accompanying changes of the image blur suppression optical system. The constant generation unit selects plural constants from the memory unit which have differed from the stored values in the constant memory unit, based on the output of the suppression detection unit. The memory unit is rewritable.

The optical device may be a camera system which includes a body unit and a fixed or detachable lens unit for the body unit, such that the constant generation unit is located in the lens unit. Additionally, a communication unit transmits generated constant signals from the constant generating unit to the body unit. The constant memory unit may also be located in the lens unit.

The optical device may include an interchangeable lens, such that the constant generation unit is located in the interchangeable lens. The optical device also includes an output unit which outputs generated constant signals from the constant generation unit to the exterior of the optical device. The constant memory unit may also be located in the interchangeable lens.

The constant generation unit causes the generation of constants which have the same value, in a fellow position symmetrically between neutral points relating to the changes of the image blur suppression optical system.

The image blur suppression drive unit is capable of driving the image blur suppression detection unit in at least two dimensions, and the constant generation unit selects constants which have differed from the stored values within the constant memory unit, based on the output of at least two dimensions of the image blur suppression detection unit.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
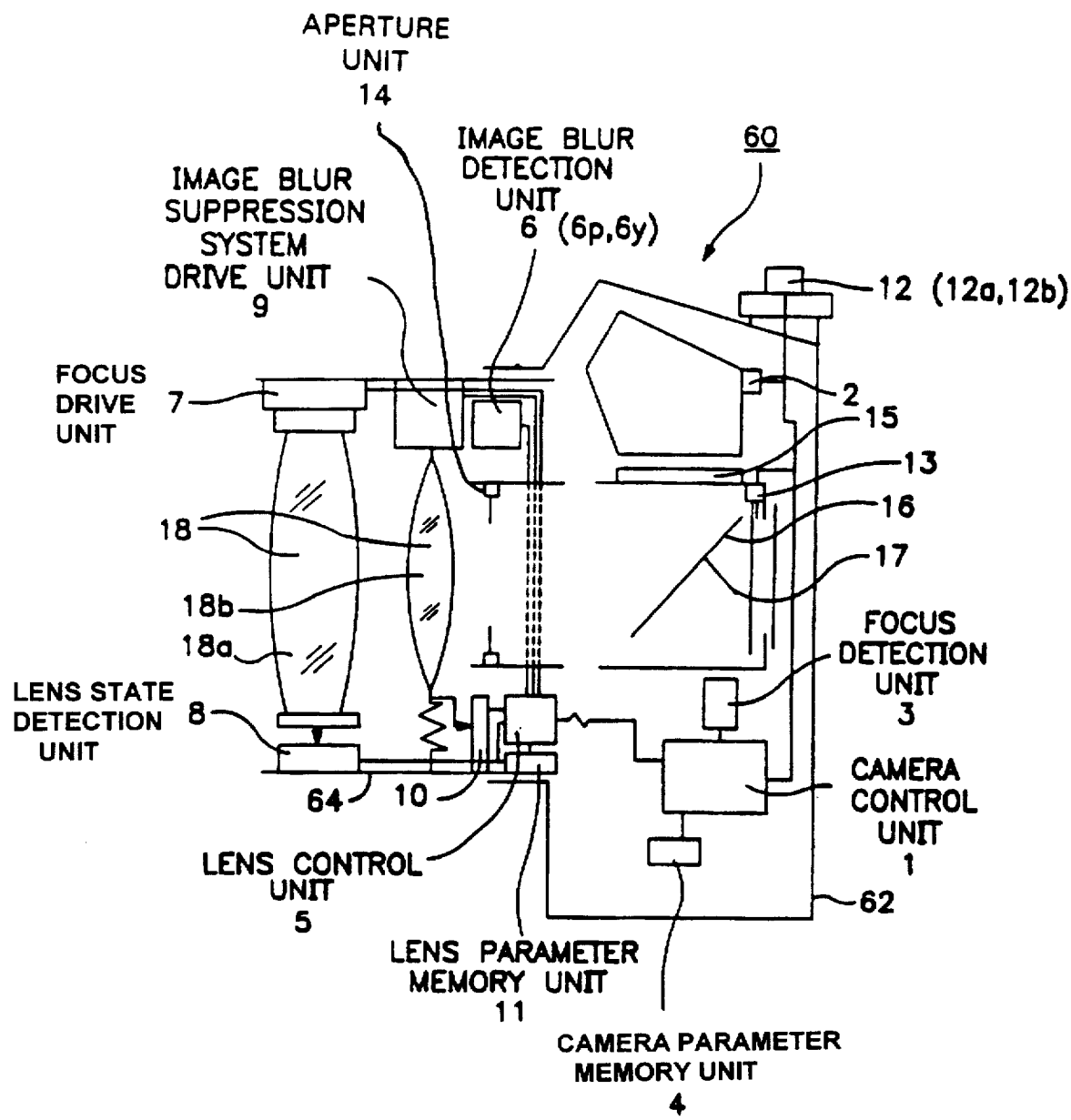
FIG. 1 is a schematic diagram showing an optical device according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Because a constant generation unit, according to the suppression position of an image blur suppression optical system of an optical device, is made such that it generates constant(s) which represent(s) the change(s) of the optical condition of the system, the optical condition due to the changes of the image blur suppression optical system can be compensated.

The constants which represent changes of the optical condition will next be described. Firstly, with a through the lens (TTL) split pupil type of a focus detection device, as an example, based upon the aspect of the occurrence of alteration of the focus detection value (defocus value) due to an aberration of the photographic optical system when image blur suppression drive is performed during focus detection, the solution of constants according to the optical device with an image blur suppression function of the present invention will be described.

Figure 10:
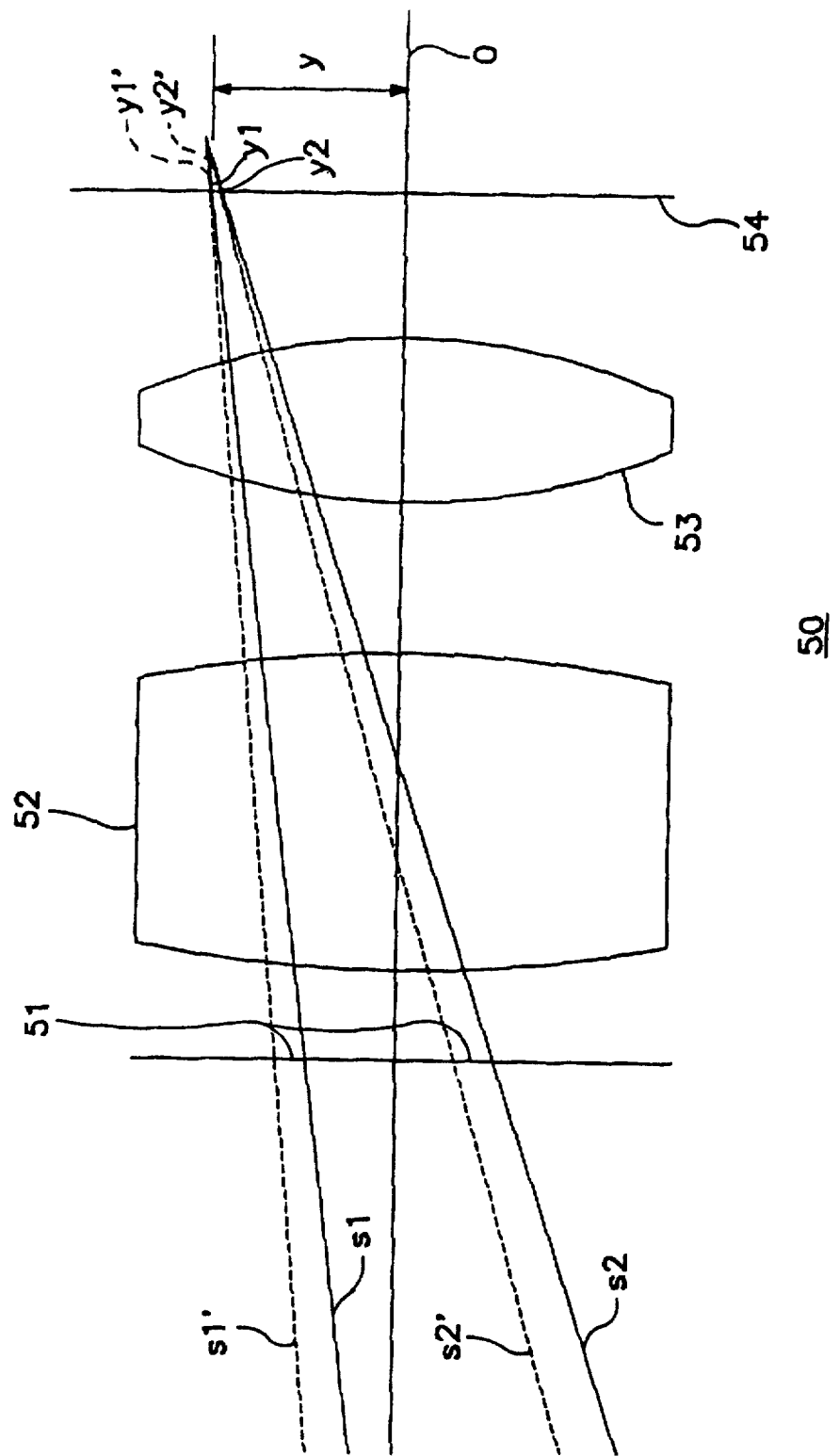
FIG. 10 is a schematic diagram which illustrates the effects which an image blur suppression drive exerts on focus detection.

FIG. 10 is a schematic diagram describing the effects of an image blur suppression drive on focus detection. In FIG. 10, the optical device has an image blur suppression lens group (hereinafter suppression lens group) 53 (optical system) which is shifted within a plane perpendicular to the photographic optical axis.

Firstly, with the conditions described below, the focus detection pupils 51 in this focus detection device are very small, and light beams which pass through the focus detection pupils 51 are represented by light rays. Moreover, within a light beam imaged at image height y, two light rays s1, s2 pass through two focus detection pupils 51, the focusing lens group 52 and the suppression lens group 53. The coordinates of the intersection of the light rays s1, s2 with a one-dimensional image plane 54 are y1, y2.

At this time, the defocus detection value (focus detection value) D is:

$$D = k \cdot (y2 - y1). \tag{Eq. 1}$$

Here, k is a coefficient (predetermined constant) which is determined by the focus detection pupils 51.

The suppression lens group 53, because it shifts during image blur suppression, when seen from the autofocus (AF) movement, corresponds to the focus detection pupils 51 shifting.

Accordingly, with a light beam imaged at an image height y, two light rays s1', s2' pass through the two focus detection pupils 51. The coordinates of the intersection of these light rays s1', s2' with the one-dimensional image plane 54 are y1', y2'. At this time, generally the following equation holds:

$$(y2 - y1) \neq (y2' - y1'). \tag{Eq. 2}$$

Moreover, when y1'=y1+dy1; y2'=y2+dy2 are set, then dy1≠dy2.

Accordingly, a defocus detection value D changes during image blur suppression, even if the photographic state (object distance, lens range ring position, etc.) is equal, due to the image blur suppression shift of the suppression lens group 53.

The reason for this is because there is aberration in the lens; specifically, as can be seen from FIG. 10, rays s1 and s1', or s2 and s2', pass through different portions of each lens block of the photographic optical system 50 including the suppression lens group 53.

The above is a description of a case in which each of the focus detection pupils 51 is infinitely small, but in the case that the focus detection pupils 51 are larger in size, numerous rays come to pass through each of the focus detection pupils 51. However, even in this case, with respect to respective rays, because the above applies, it is considered to be similar even for the imaging centroid of the rays as a whole.

Generally, the change of the defocus detection value is larger, when the image blur suppression shift amount becomes larger, and is larger when the focus detection image height is higher. Moreover, generally, there are many cases in which the alteration of aberration becomes greater in the case that the position of the two focus detection pupils 51 is mutually far (in positions close to the lens periphery) than in the case when it is mutually close (in positions close to the lens center).

Furthermore, FIG. 10 has been described in terms of a one-dimensional movement of the suppression lens group 53 within a plane perpendicular to the photographic optical axis 0, but in an optical device such as that of the present invention, the suppression lens group 53 may be driven two dimensionally within a plane perpendicular to the photographic optical axis 0.

In such cases, the abovementioned lens aberration becomes a more complicated relationship, and the defocus detection value D detected by the focus detection device undergoes complicated changes. For example, according to shifts of the image blur suppression lens group 53 performed in some direction with respect to the direction linking the two rays s1 and s2 passing through the two focus detection pupils 51, the defocus detection value D changes in a complicated manner. The effect when the image blur suppression lens group 53 shifts in a direction parallel to the direction linking the rays s1 and s2, in many cases, is that the change in the defocus detection value D is generally greater than in the case of a direction perpendicular to the abovementioned direction.

Moreover, there are cases in which, due to differences in the photographic state (subject distance, lens range ring position, etc.), the change in the defocus detection value D for the same shift amount becomes different.

Due to such shifts, with respect to changes in the defocus detection value D, for example, with the defocus amount=0 (the case in which the image blur suppression lens group 53 does not shift) as a standard, the change in the defocus detection value D of each position is known beforehand.

In this case, if the difference of the defocus detection value in each position is used as a compensation constant when calculating the defocus detection amount, it becomes possible to eliminate the change of the defocus detection value according to the change in shift position.

For example, let the photographic state be shift amount=0 (the standard state). At this time, the defocus detection value D (0) is obtained.

Here, if the lens is in a focused state (true defocus amount=0), the defocus detection value becomes as follows:

$$D(0)=0. \qquad (Eq. 3)$$

Next, with the photographic state of the lens unchanged, and the shift position of the image blur suppression lens group 53 being in a predetermined direction, the defocus detection value being D(x1) because of a moved state x1 is given by the following equation:

$$D(x1)=C1. \qquad (Eq. 4)$$

The possibility that C1 becomes C1≠0 is as previously described.

Below, in the shift position x2, the defocus detection values as D(x2)=C2, D(x3)=C3, . . . , are generally represented by the following equation:

$$D(xN)=CN; \text{ (N being an integer value)}. \qquad (Eq. 5)$$

The values of CN, with respect to a focus detection device, for example, may be values previously obtained by experiment for individual lenses. Moreover, with respect to this focus detection device, the values may be representative values found by predetermined calculations based on lens design data. The values of CN are defocus change amounts due to shift positions, and are defocus compensation constants.

Here, on the contrary, with the shift position of the suppression lens group 53 in a moved state xM (M=a predetermined value) in a predetermined direction, the defocus detection value D(xM) is obtained.

Because the defocus change amount is CM in this shift position, the effect of the defocus detection value change due to the shift position is eliminated by the following equation, and the true defocus amount can be calculated.

$$D(0)=D(xM)-CM. \qquad (Eq. 6)$$

In this manner, if the shift position of the suppression lens group 53 when the defocus detection value D is detected is known, a calculation becomes possible with the effect of the defocus amount alteration due to the shift position eliminated.

The optical device of the present invention, as was previously described, preferably drives the image blur suppression lens group (optical system) two dimensionally within a plane which is perpendicular to the photographic optical axis. In such a case, the defocus change amount has to be determined by treating the shift position two dimensionally.

The two-dimensional shift amount, namely the defocus compensation constant, has a value according to the following equation.

In the case of a lens photographic state of shift amount=0, D(0)=0 (focused state), $$D(xN, x'N')=C(N, N'). \qquad (Eq. 7)$$

where:

x, x' denote coordinate systems of respective different suppression drives, and N, N' denote respective integer values (suppression drive positions).

This value may be used the same as the previous compensation constant. This defocus compensation constant takes the form of a function relating to the two-dimensional position. In short, if the shift position of the image blur suppression shift group can be detected two dimensionally, similarly to the previously mentioned one-dimensional case, a calculation becomes possible with the effect of the defocus amount alteration due to the shift position being eliminated, using the previously found value of C(N, N').

Furthermore, as was previously described, according to the differences of the range ring position or zoom position of the photographic optical system 50, there are also cases in which there are further changes in the value of C(N, N').

In this case, further defocus compensation coefficients are determined according to the following equation.

In a predetermined lens range ring position (z) and zoom position (z'), in a lens photographic state of shift amount=0, in the case that D(0)=0 (focused state), $$D(z, z', xN, x'N')=C(z, z', N, N'). \qquad (Eq. 8)$$

where:

z denotes an optical lens range ring position, z' denotes an optical lens zoom position, x, x' denote coordinate systems of respective different suppression drives, and N, N' denote respective integer values (suppression drive positions).

Moreover, in relation to photometry, because a constant generation unit provides constants for photometry to a photometric calculation unit, based upon the suppression position of the suppression lens group (optical system) 53, the photographic optical system 50 is always capable of accurate photometry, independently of the state of the suppression optical system.

Here, in particular, also in relation to the TTL type of photometric devices which are commonly used in SLR cameras, a further description is given with regard to the point that alteration of the photometric value occurs when image blur suppression driving is performed during the photometric detection operation.

Figure 11:
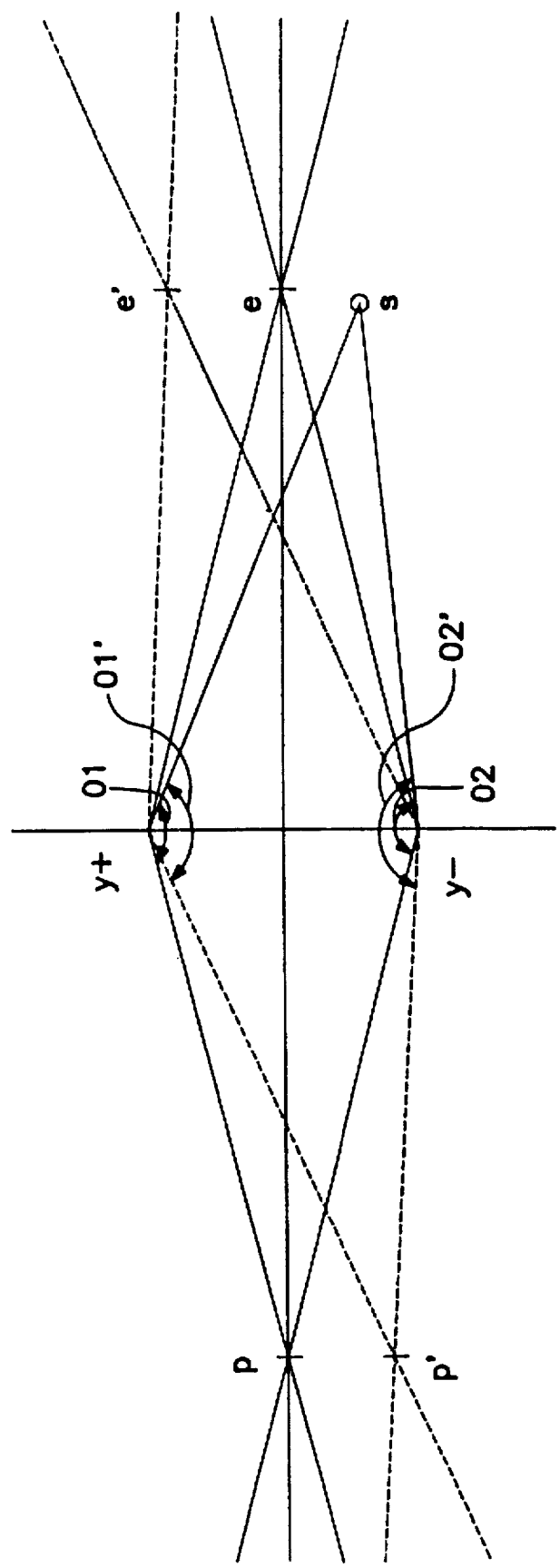
FIG. 11 is a diagram illustrating an effect exerted on TTL photometry by the driving of the image blur suppression optical system.

FIG. 11 is a diagram to illustrate the effect exerted on TTL photometry by image blur suppression driving. The aperture of a lens is made small without limit. Because of this, a ray which passes through the incident pupil point p is imaged as an image height y+(y−) on the image plane (matte surface of the viewfinder). When a screen consists only of a Fresnel lens, this ray, by the action of the Fresnel lens, faces the eye point e, but in actuality, because it is diffused by the matte surface, is also incident on the received light element s.

The diffusion of the matte surface is isotropic, and the amount of diffusion is $T(\theta)$ in the angular direction $\theta$, $T(\theta1)$ from the image height y+, and $T(\theta2)$ from the image height y−, which are the amounts of light incident on the light receiving elements. At the eye point e, in addition, an amount of light T(0) goes to the eye point e.

Shifting the suppression lens group 53 corresponds to the incident pupil point shifting. The dotted lines of FIG. 11 show the imaging in this case. At this time, the amounts of light incident on the light receiving elements become $T(\theta1')$ from the image height y+, and $T(\theta2')$ from the image height y−. As is clear from FIG. 11, because $\theta1 \ne \theta1'$, and $\theta2 \ne \theta2'$, then $$T(\theta1) \ne T(\theta1'), \text{ and } T(\theta2) \ne T(\theta2'). \quad \text{(Eq. 9)}$$

Namely, the amount of light received changes because of image blur suppression. When the photometric value E is generally expressed as the subject luminosity B and the F number value of the lens is F0 at the time of photometry, then $$E = B \cdot F0 \cdot m \text{ (m being a predetermined constant in a photometric value calculation coefficient).} \quad \text{(Eq. 10)}$$

The above is the case in which the lens aperture is infinitely small. In the case that the lens aperture is of a larger size, multiple rays come to pass through the incident pupil. But for respective light rays, the above conclusions hold, and as a result, the photometric amount as a whole is changed.

The effect of image blur suppression on photometry is according to the photometric image height, the shift amount of the suppression lens group, and the shift direction with respect to the photometric device.

Figure 2:
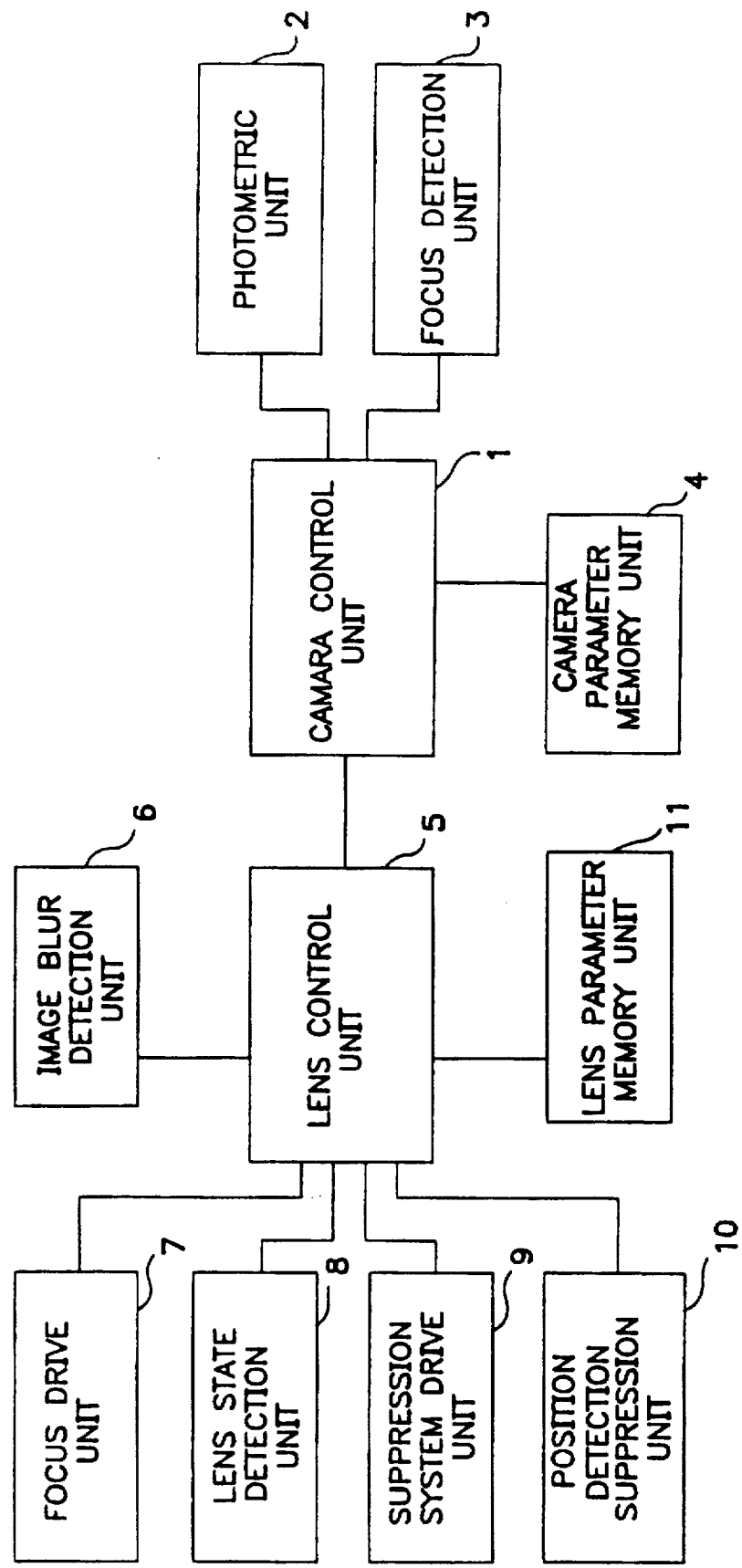
FIG. 2 is a block diagram showing the optical device according to the embodiment of the present invention.

FIGS. 1 and 2 are diagrams showing an optical device 60 according to an embodiment of the present invention. In this embodiment, the optical device 60 is a camera including a body unit 62 and a lens unit 64. A camera control unit 1 is connected to both the body unit 62 and the lens unit 64, and detects the detection output of the photometric unit 2 and the focus detection unit 3, and the state of the release switch 12 (described later), etc., using stored values, etc., stored in a camera parameter memory unit 4. Additionally, the camera control unit 1 calculates, performs determination of states, stores necessary data, and communicates transmission data and the necessary instruction data for a lens control unit 5 and other various portions of the camera, shown in or omitted from the drawings. Also, the camera control unit 1, in various circumstances, operates according to communications from the lens control unit 5.

The photometric unit 2 receives reflected subject light on a viewfinder screen 15 (described later), and the output is connected to the camera control unit 1. The focus detection unit 3 detects the imaging state of the photographic optical system 18 (described later) and its output is connected to the camera control unit 1. The focus detection unit 3 is a split pupil type, and can perform focus detection for plural regions on the photographic picture plane.

Figure 4:
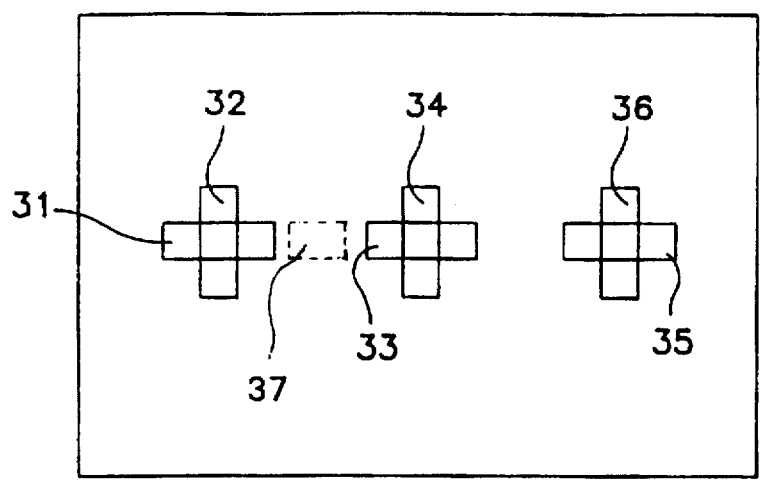
FIG. 4 is a diagram showing focus detection regions in a photographic picture plane of the optical device according to the embodiment of the present invention.
Figure 6:
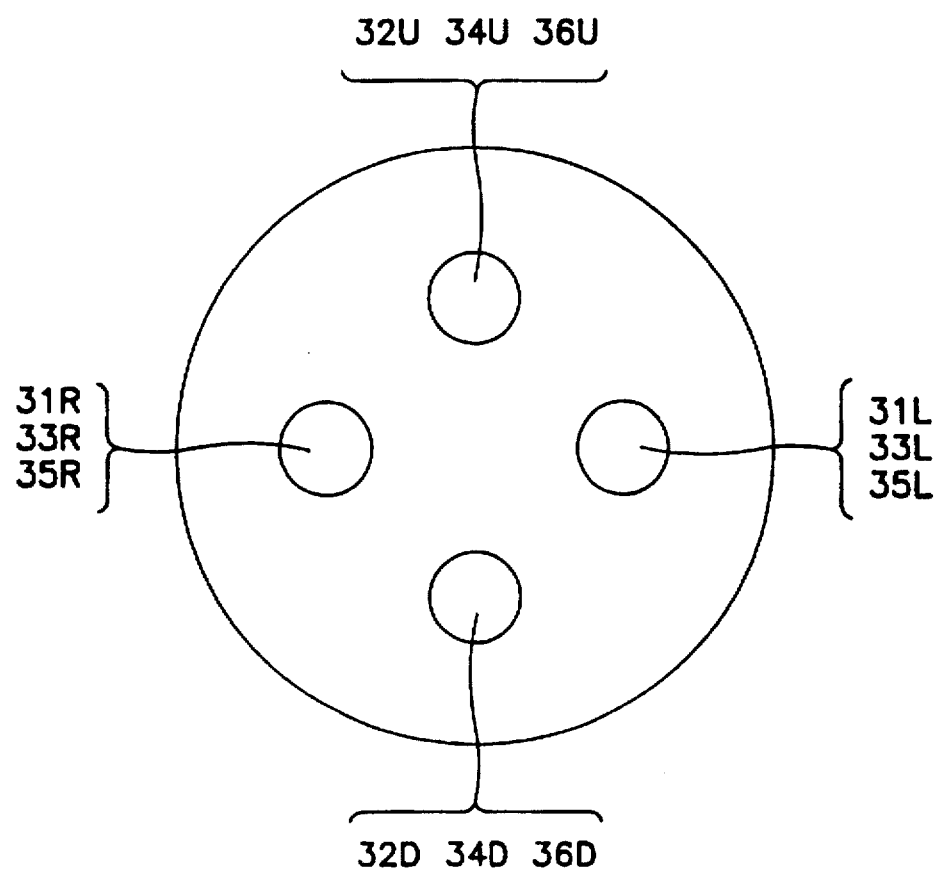
FIG. 6 is a diagram of a focus detection pupil shown in FIG. 5 as seen from an incident side of a lens.
Figure 5:
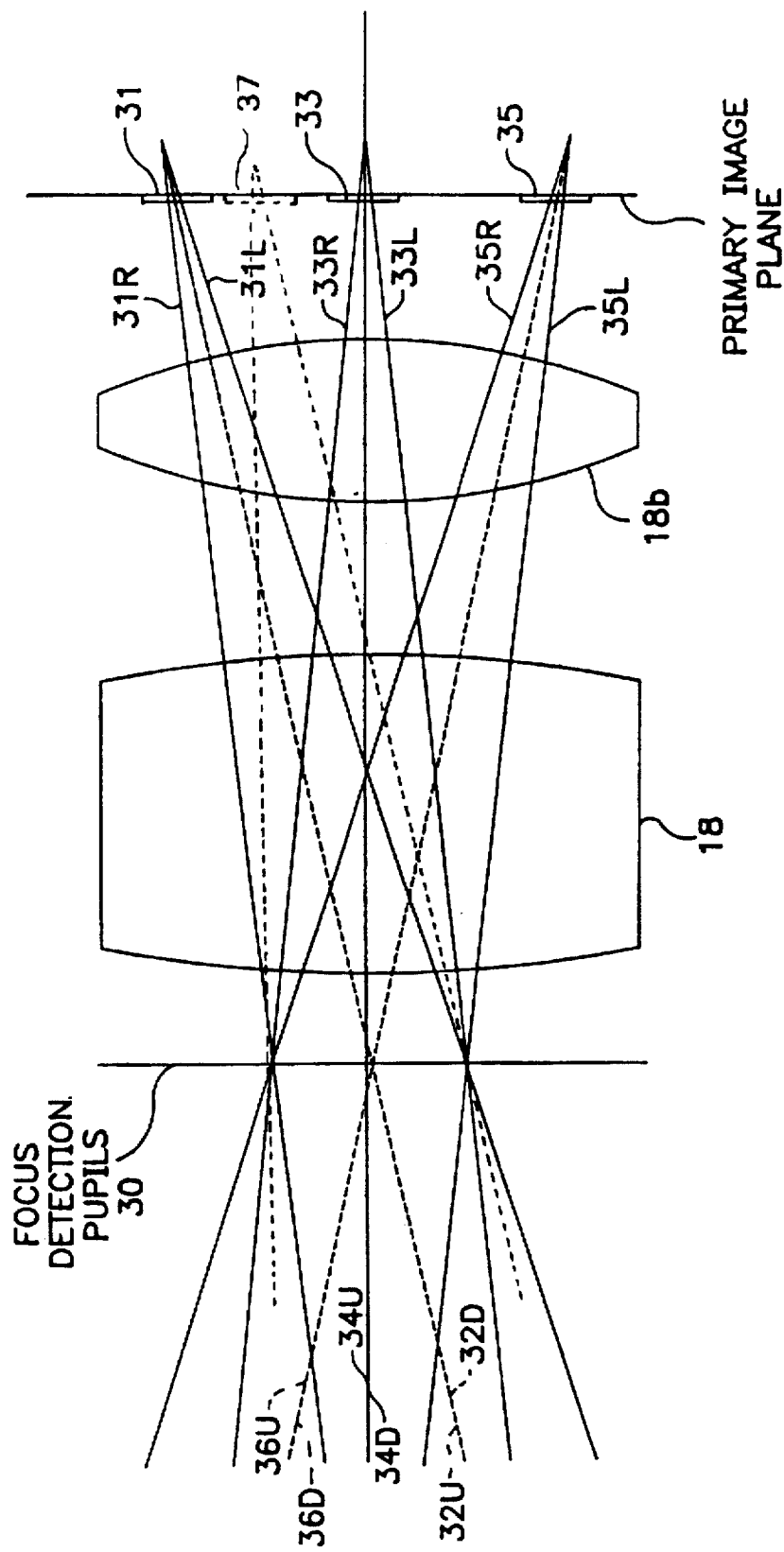
FIG. 5 is a diagram showing the focus detection pupils relating to each focus detection region of the optical device according to the embodiment of the present invention.

FIG. 4 is a diagram showing the focus detection regions in the photographic picture plane of the focus detection unit 3 of the optical device according to the embodiment. FIG. 5 is a diagram showing the focus detection pupils 30 relating to each focus detection region of the optical device according to the embodiment. FIG. 6 is a diagram of the focus detection pupils 30 shown in FIG. 5, seen from the incidence side of the lens.

The focus detection unit 3 provides for three focus detection regions 31–32, 33–34, and 35–36 which are disposed in the form of islands in a photographic region. The focus detection regions 31–36 are respectively rectangular (in actuality linear, of very narrow width) regions. The regions 31 and 32, regions 33 and 34, and regions 35 and 36 are constituted by cruciform regions such as to have respectively overlapping regions.

Respective focus detection elements are located in region 31, region 33 and region 35; these focus detection elements, in the case that the camera optical system 18 as seen from the front, have focus detection pupils to the left and right in the horizontal direction. The focus detection elements of each region 31, 33 and 35, as shown in FIG. 5, respective light beams 31L and 31R, light beams 33L and 33R, and light beams 35L and 36R are used (these are representatively shown by straight, full lines).

Moreover, respective focus detection elements are located in region 32, region 34 and region 36; these focus detection elements, in the case that the camera optical system 18 is seen from the front, have focus detection pupils to the top and bottom in the vertical direction. The focus detection elements of each region 32, 34 and 36, as shown in FIG. 5, respective light beams 32U and 32D, light beams 34U and 34D, and light beams 36U and 36D are used (these are representatively shown by straight, broken lines).

The camera parameter memory unit 4 stores necessary data for calculations performed by the camera control unit 1. A ROM, EEPROM, SRAM, flash memory and similar digital electronic elements are suitably used, but dip switches or similar digital components, or resistors, semi-permanent resistors, potentiometers and other analog elements will serve the purpose.

The lens control unit 5, as shown in FIGS. 1 and 2, is connected to the body unit 62 and the lens unit 64. The detection outputs of the image blur detection unit 6, lens state detection unit 8, image blur suppression position detection unit 10 (hereinafter referred to as suppression position detection unit) etc., are connected to the lens control unit 5, and using the stored values kept in the lens parameter memory unit 11, the lens unit 5 performs calculations, state detection, and storage of necessary data. The lens control unit 5 controls the focus drive unit 7, the image blur suppression system drive unit 9 (hereinafter referred to as suppression system drive unit), and other various portions of the camera, shown in or omitted from the drawings. Moreover, the lens control unit 5 according to various circumstances, operates according to communications from the camera control unit 1, through the control of the camera control unit 1, and communicates the above-mentioned data to the camera control unit 1.

The image blur detection unit 6 detects vibration applied to the optical device 60. A well-known angular velocity sensor (vibration gyro) and the like is suitably used. The image blur detection unit 6 has a pitch angular velocity sensor 6p which detects angular velocity in the camera vertical direction, and a yaw angular velocity sensor 6y which detects angular velocity in the camera horizontal direction (see FIG. 1).

The focus drive unit 7 causes movement of the photographic optical system 18 (described below) in the optical axis direction, and regulates the imaging state. The lens state detection unit 8 detects the positional situation of the photographic optical system 18 (described later), which is driven by the focus drive unit 7. The lens state detection unit 8, for example, suitably uses an encoder and the like disposed in a focus ring used for focus drive, but may detect the drive amount from a predetermined position of an actuator (DC motor, ultrasonic motor and the like) used for focus driving, or may be an analog detection device with resistors and brushes. Moreover, the movement position may be detected by fixing the encoder and the like directly to the photographic optical system 18.

The suppression system drive unit 9 constitutes a portion of the photographic optical system 18, and by driving an image blur suppression optical system (hereinafter referred to as a suppression optical system) 18b in the camera vertical direction and horizontal directions, thereby moving the same two dimensionally within a plane perpendicular to the optical axis, causes deflection of the photographic light beams, preventing image blur on the picture plane of the camera 60.

The suppression position detection unit 10 detects the drive position in the camera vertical direction and horizontal direction of the suppression optical system 18b which has been driven by the suppression drive unit 9. The suppression position detection unit 10 may be an encoder and the like which has been arranged in a rotary drive member for suppression drive use in each direction, but may be such as to detect the drive amount, from a predetermined position, of an actuator (DC motor, voice coil, ultrasonic motor, and the like) for suppression drive use in each direction. Further, the image blur suppression position detection unit 10 may be an analog detection device with resistors and brushes, and may be directly fixed to the image blur suppression optical system 18b, such as to detect the drive position.

The lens parameter memory unit 11 stores the data necessary for the calculations and the like performed by the lens control unit 5. The lens parameter memory unit 11, as has previously been described, stores defocus compensation coefficient data corresponding to changes of the defocus detection value detected by the focus detection unit 3 of the camera body due to effects on the focus detection of the image blur suppression. The lens parameter memory unit 11 may be a ROM, an EEPROM, an SRAM, a flash memory or other similar digital electronic element, but dip switches or similar digital components, or resistors, semipermanent resistors, potentiometers or other analog elements will serve the purpose. Moreover, the lens parameter memory unit 11 can also communicate stored data to the camera control unit 1 by the communication function of the lens control unit 5.

Next, with reference to FIG. 1, the schematic structure of the present embodiment will be described (omitted in the block diagram of FIG. 2).

The release switch 12 is constituted by a half depression switch 12a which is set ON by a half depression of a release button, and a full depression switch 12b which is set ON by a full depression of the release button, and is connected to the camera control unit 1.

The shutter unit 13 controls the exposure time to the film, and is connected to the camera control unit 1. The aperture unit 14 controls the exposure illumination to the film, and is connected to the lens control unit 5.

The viewfinder screen 15 reproduces the subject image. A main mirror 16 via which a portion of the photographic light beam is reflected to the viewfinder screen 15, is a half mirror. An auxiliary mirror 17 is a mirror via which a portion of the photographic light beam which has passed through the main mirror 16 is reflected to the focus detection unit 3. The photographic optical system 18 is an optical system which includes a focusing lens system 18 and the suppression optical system 18b.

Figure 3:
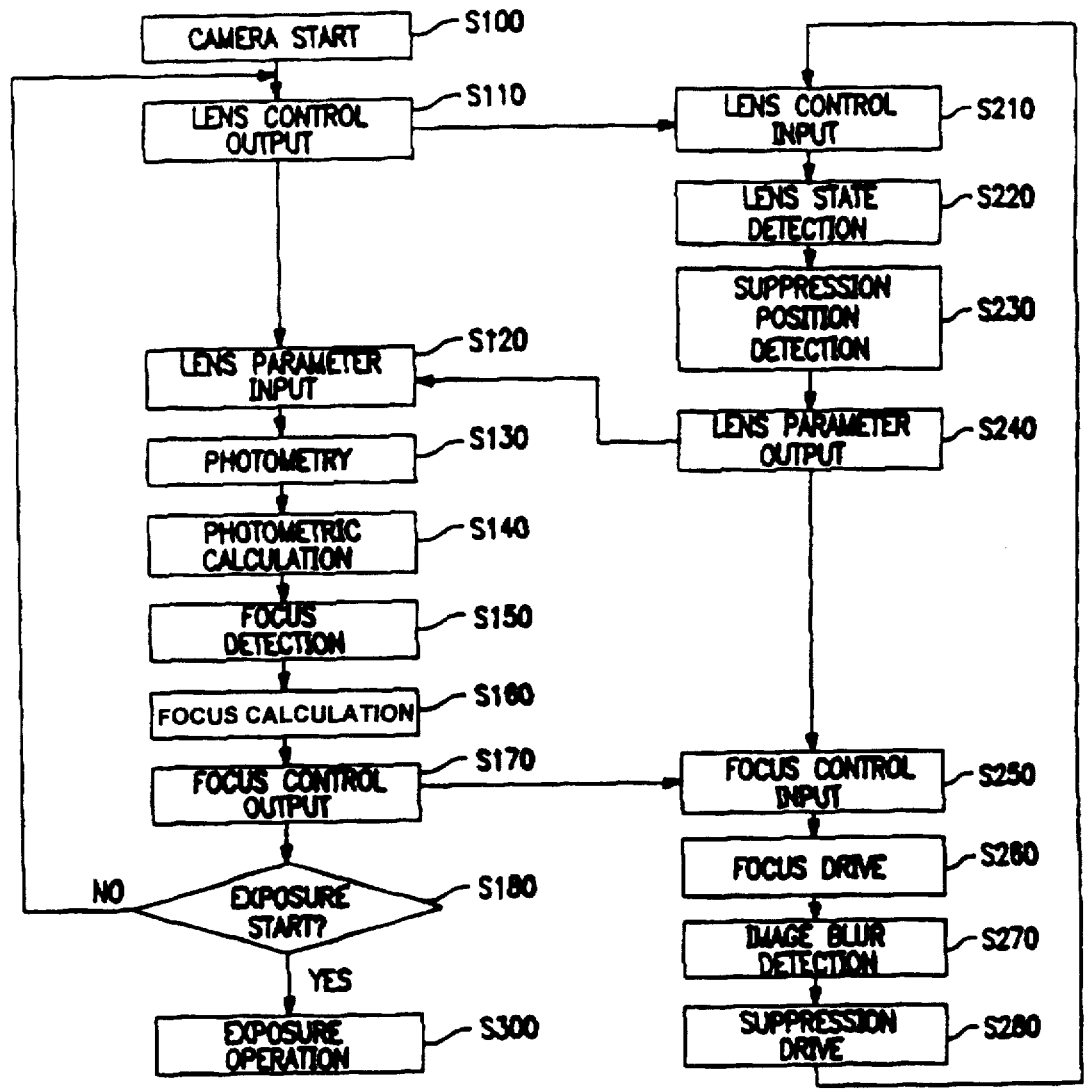
FIG. 3 is a flow chart which describes the operation of the principal portions of the optical device according to the embodiment of the present invention.

FIG. 3 is a flow chart to describe the operation of the essential portions of the optical device according to this embodiment.

This flow commences the operation from step (abbreviated "S" hereinbelow) 100 by a half depression of the release switch 12, setting the half depression switch 12a ON. The steps in the 100s (S100–S180) are operations performed by the camera control unit 1. The steps in the 200s (S210–S280) are operations performed by the lens control unit 5.

In S110, the camera control unit 1 outputs an operation control signal such as to perform operations S210 and below, with respect to the lens control unit 5. This step, if it is the initial routine, is carried out after the provision of the power supply to the lens or the output of a reset instruction.

Operations on the lens side are described below.

In S210, the lens control unit 5 inputs an operation control signal from the camera control unit 1, and proceeds to S220. In S220, the lens control unit 5 inputs a detected position data (optical axis direction) signal of the focusing lens system 18a from the lens state detection unit 8. In S230, the lens control unit 5 inputs drive position data signals for the camera vertical direction and horizontal direction of the suppression optical system 18b detected by the suppression position detection unit 10.

In S240, the lens control unit 5 calls up from the lens parameter memory unit 11 (constant memory unit), defocus compensation constant data which correspond to the position data of the focusing lens system 18a and the suppression optical system 18b, which were input in steps 220 and 230, and outputs them to the camera control unit 1, as lens parameters corresponding to the lens state.

Operations on the body side are next described.

In S120, the camera control unit 1 inputs lens parameters from the lens control unit 5.

In S130, the camera control unit 1 inputs detection data relating to subject luminosity from the photometer unit 2. In S140, the camera control unit 1 performs calculations to find the true subject luminosity, based on the detection data from the photometric unit 2 obtained in S130.

In S150, the camera control unit 1 inputs defocus value data relating to the image state of the photographic optical system 18 from the focus detection unit 3. In S160, the camera control unit 1 performs calculations to find the true defocus amount, based on the lens parameters of the defocus data which were obtained in S120 and the defocus value data from the focus detection unit 3, which were obtained in S150. As a result, the camera control unit 1 calculates the amount of displacement of the true focal point.

In S170, the camera control unit 1 outputs a focus control signal with respect to the lens control unit 5 so as to perform suitable focus drive control, based on the true defocus amount which was found by the calculation in S160.

Continuing, operations on the body side are described.

In S180, the camera control unit 1 determines whether or not a signal causing exposure to commence has been input; if the signal has been input, the process advances to the control of the exposure operation in S300 and subsequent steps, and if not input, the process returns to S110.

Relating to the exposure operations of S300 and the subsequent steps, because they conform to the sequence of an exposure operation performed by a conventional camera, a description thereof is omitted. Additionally, in S300 and thereafter, when exposure is commenced, the exposure commencement data is output to the lens side, and when the exposure is completed, exposure completion data is output.

The input of the above-mentioned exposure operation commencement is performed via the full depression switch 12b of the release switch 12 being set ON.

On the other hand, the operation at S170 of the lens side which has output a focus control signal will be described.

In S250, the lens control unit 5 inputs a focus control signal generated from the camera control unit 1 in S170.

In S260, the lens control unit 5 causes focus driving, outputting a drive signal to the focus drive unit 7, such as to cause movement in the optical axis direction of the focus adjustment unit (may be a portion or the whole) of the photographic optical system 18 by a suitable amount according to its focus control signal. At this time, the detection signal of the positional situation in the optical axis direction of the photographic optical system 18 from the lens state detection unit 8 may be used as a feedback signal for drive control.

In S270, the lens control unit 5 inputs from the image blur detection unit 6 a detection signal of the vibration which is applied to the optical device and indicative of the image blur on the image plane of the optical device 60 resulting therefrom.

In S280, the lens control unit 5 causes auxiliary driving, outputting a drive signal to the suppression system drive unit 9, to suitably prevent this image blur, the drive signal determined by calculating the generated image blur, based on the blur detection signal. At this time, the detection signal of the drive position of the suppression optical system 18b from the image blur suppression position detection unit 10 may be used as a feedback signal for drive control.

After S280 has been carried out, the process on the lens side returns to S210.

In the above-mentioned flow, in the case in which the set focus operation mode of the optical device is the manual focus mode, the process advances to S260 without carrying out a focus drive operation. Moreover, S170, S250 and S260 also are not carried out, and may be omitted.

In the same way, in the photographic preparatory steps in the optical device 60, the image blur suppression drive is not performed, in the case that the so-called "exposure time only anti-blur drive mode" has been set, and the routine proceeds without carrying out S280. In this case, the position of the suppression optical system 18b is usually a predetermined position (for example, when passing through S210 initially, the lens control unit 5 outputs a reset operation instruction to the suppression system drive unit 9, causes positioning of the suppression optical system 18b in the predetermined reset position; or, after the completion of exposure, the lens control unit 5 controls the suppression drive unit 9 such as to cause positioning of the suppression optical system 18b in a predetermined reset position, etc.), the step of S230 is omitted, and defocus compensation constant data may be output to the camera control unit 1, corresponding to the characteristics of the suppression optical system 18b of a predetermined position.

Of course, because the suppression optical system 18b may suddenly undergo a displacement from the above-mentioned predetermined position due to shocks and the like applied to the optical device 60 from the exterior, even at the time of "exposure time only anti-blur drive mode", S230 may be carried out.

At the time of "exposure time only anti-blur drive mode", in the operations which have been described in FIG. 3, S270 may not always be necessary (because there is no anti-blur drive in the preparation for photography). However, a display to notify the photographer of the degree of vibration or image blur, in the case of performing a warning by a tone and the like, becomes necessary in S270. In this case, when the warning is performed on the body side, the presence or absence of a warning, stages of a warning, and the like data may be output in S240 from the lens side to the body side together with this.

Next, in relation to the alteration of the focus detection values by the suppression optical system 18b, the contents of the flow chart of FIG. 3 will be described more specifically.

Figure 7:
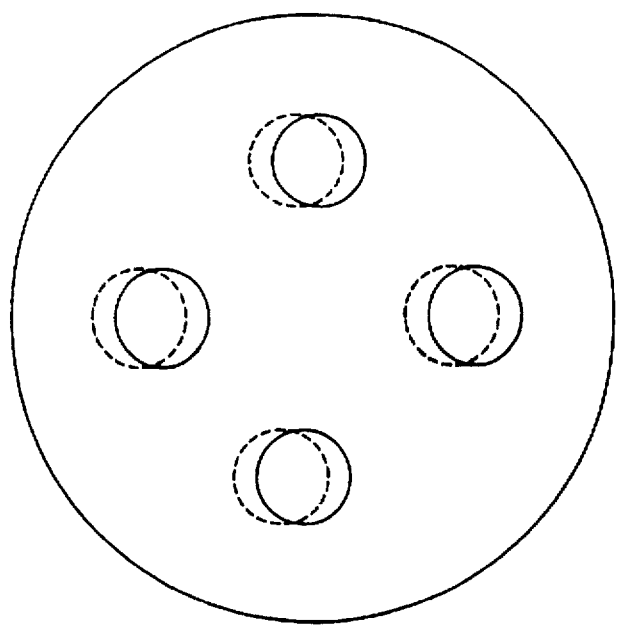
FIG. 7 is a diagram of focus detection pupils, seen from the incident side of the lens.

FIG. 7 is a diagram showing the situation caused by shifting the suppression optical system 18b from the state of FIG. 6. This is the same as the situation illustrated in FIG. 10.

Light beams 31R and 31L are used in the focus detection region of region 31. As mentioned above, the configuration becomes asymmetrical with respect to the photographic optical system 18, and the case in which a shift is not caused and the condition of aberration are different. Consequently, the focus detection calculation of this region 31, in the case in which a shift is not performed and a similarly performed case, results in the calculated true defocus amounts being different. However, relating to the whole photographic picture plane, because the change is not large for the whole beam used in photography, the alteration of the focus state of the photographic optical system is not preferred from the aspect of quality of the photographic picture.

Here, the suppression optical system 18b unambiguously defies the condition of aberration with respect to its shift position. As a result, if its shift position is detected, as described in the foregoing (see description of FIG. 10), the compensation constant can properly be used when calculating the true defocus amount.

Consequently, as described in the above-mentioned "S240", the lens control unit 5 transmits to the body side, which performs the actual focus detection, a defocus compensation constant corresponding to the position data of the suppression optical system 18b.

Here, as shown in FIGS. 4 through 7, with respect to a predetermined shift position of the suppression optical system 18b, the aberration conditions of the light beams used in the respective focus detection of regions 31–36, may be considered to be all different. For example, when the shift position of the suppression optical system 18b is "0", the defocus detection values in the regions 31–36 are "0" (focus). Next, when the suppression optical system 18b has been shifted to a predetermined position, the regions 31–36 may be considered to have defocus detection values which are all different.

The reason for this is that the light beams 31R, 31L–36U, 36D are beams which all have different aberration conditions (the combinations of pupil position and image height are all different).

Consequently, in an optical device having plural focus detection regions as described in this embodiment, it is generally the case that the defocus compensation constants which are determined by the drive positions of the suppression optical system become plural. Accordingly, the parameters relating to the defocus compensation constants which are transferred for the lens control unit 5 to the camera control unit 1 consist of six kinds, the same as the number of range regions. In other words, with respect to some predetermined suppression drive position, parameters are set relating to six defocus compensation constants.

In an optical device which performs photometry as described in this embodiment, the photometric compensation constants are also determined by the drive positions of the suppression optical system. Namely, the parameters relating to the photometric compensation constants are transferred from the lens control unit 5 to the camera control unit 1 because parameters are set relating to the photometric compensation constants.

The parameters relating to both the defocus compensation constants and the photometric compensation constants are set corresponding to discrete predetermined suppression drive positions having suitable intervals. When the suppression drive positions are not in these discrete position, the parameters of the closest predetermined positions may be used.

Moreover, the parameters may be found by interpolation from those corresponding to the above-mentioned predetermined positions of the two to three directly closest places.

Furthermore, as mentioned previously, a provision for six kinds of parameters relating to the defocus compensation constants with respect to some predetermined suppression drive positions is established, but with respect to the above-mentioned predetermined suppression drive position(s) (two-dimensionally multiple places may be set), it is necessary to provide for six-fold multiplicity of these parameters. Additionally, a provision for parameters relating to the photometric compensation constants with respect to some predetermined suppression drive positions is established, but with respect to the above-mentioned predetermined suppression drive position(s) (two-dimensionally multiple places may be set), it is necessary to provide for a two-dimensional multiplicity of these parameters. This requires the lens parameter memory unit 11 to be a large capacity memory unit.

Here, for example, as shown in FIGS. 4 and 5, focus detection regions 31 and 35 are formed symmetrically with respect to the photographic optical system. If the defocus compensation constant with respect to the region 31 when the suppression optical system 18b is moved by a certain amount to the right is, for example, C 31 (N, N'), and the defocus compensation constant with respect to the region 35 when the suppression optical system 18b is moved by a certain amount to the left is, for example, C 35 (–N, –N'), it can be assumed that C 35 (N, N')=C 35 (–N, –N'). Here, N denotes the suppression optical system drive amount in the horizontal direction, and N' denotes the suppression optical system drive amount in the vertical direction.

Moreover, from the symmetry of region 31, region 33, region 35 which are respectively detection pupils to the left, center and right, it can be assumed that C 31 (N, N')=C 31 (N, –N'), C 33 (N, N'), =C 33 (N,–N') and C 35 (N, N')=C 35 (N, –N').

Accordingly, it can be assumed that C 31 (N, N')=C 31 (N, –N')=C 35 (–N, –N')=C 35 (–N, N'), and the defocus compensation constants become lumped together.

Figure 8:
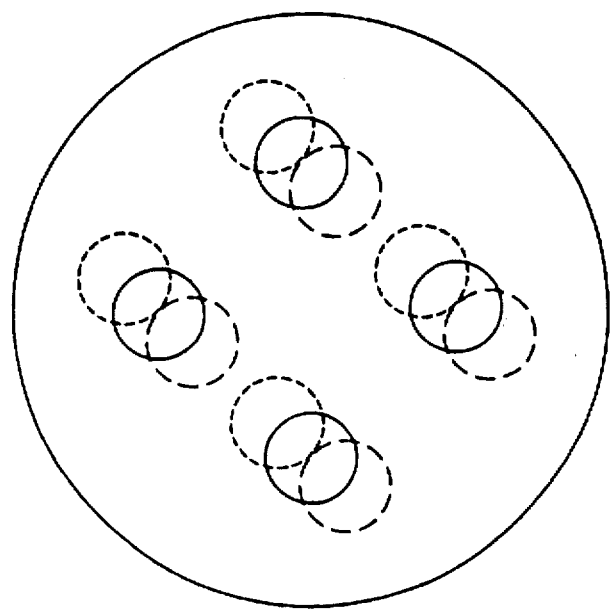
FIG. 8 is a diagram of focus detection pupils, seen from the incident side of a lens.
Figure 9:
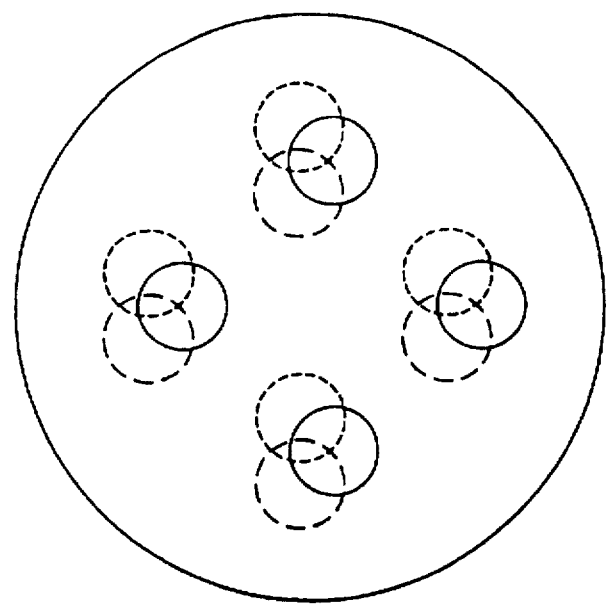
FIG. 9 is a diagram of focus detection pupils, seen from the incident side of a lens.

In relation to the focus detection regions 32, 34 and 36, from their symmetry when the suppression optical system 18b is moved upwards by a given amount, if with respect to each region the defocus compensation constants are C 32 (N, N'), C 34 (N, N'), and C 36 (N, N'), and when the suppression optical system 18b is moved downwards by a given amount, it can be assumed that with respect to each region the defocus compensation constants are C 32 (N, –N'), C 34 (N, –N'), and C 36 (N, –N'), then, C 32 (N, N')=C 32 (N, –N'), C34 (N, N')=C 34 (N, –N'), and C 36 (N, N')=C 36 (N, –N'). The above relationships are shown in FIGS. 8 and 9.

As has been shown in FIG. 11, in a case in which the movement of point p→point p' is in a direction perpendicular to the plane of the paper, because the change of the light incident on the light receiving elements s is symmetrical with respect to point p, it is also possible to store the parameters in common, and it is possible to compress the storage capacity.

In the above manner, the lens parameter memory unit 11, with respect to a given drive position of the suppression optical system, stores six parameters relating to defocus compensation constants, but there is no reason to say that all of these are different. In different drive positions, as above mentioned, the parameters with respect to the same or a different region can be placed in common. The lens parameter memory 11, in the case of placing the parameters in common as above mentioned, can be designed on a small scale, with reduced cost, etc.

When the symmetry of the detection is not preserved, or when the effect is eliminated of the asymmetry of regions during construction of the photographic optical system including the suppression optical system, it is more desirable for the lens parameter memory unit 11, with respect to a predetermined drive position of the suppression optical system, to store all necessary parameters relating to the photometric compensation constants, as well as store to the parameters relating to the defocus compensation constants.

The lens parameter memory unit 11 may be made such as to store, as the above-mentioned parameters, values found experimentally during manufacture. In this case, in particular, the lens parameter memory unit 11 is conveniently an EEPROM, flash memory, or similar erasable and rewritable element. Moreover, as aforementioned, in the case that the parameters are made common, it is more advantageous that the lens parameter memory unit 11 is made a mask ROM or similar low cost memory element.

When the symmetry of the detection is not preserved, or when the effect of the asymmetry of regions during construction of the photographic optical system including the suppression optical system is eliminated, it is more desirable for the lens parameter memory unit 11, with respect to a predetermined drive position of the suppression optical system, to store all the necessary parameters relating to the photometric compensation constants, as well as the parameters relating to the defocus compensation constants.

In the embodiment described above, it is necessary for the lens control unit 5 to output (a maximum of) six kinds of parameters to the camera control unit 1, corresponding to the six places of focus detection regions. However, the optical device, in the case of having more numerous focus detection regions, communicates a smaller number of parameters than the number of focus detection regions. The camera control unit 1, by performing an appropriate suppression process, may calculate the defocus compensation constants of each region.

Figure 12:
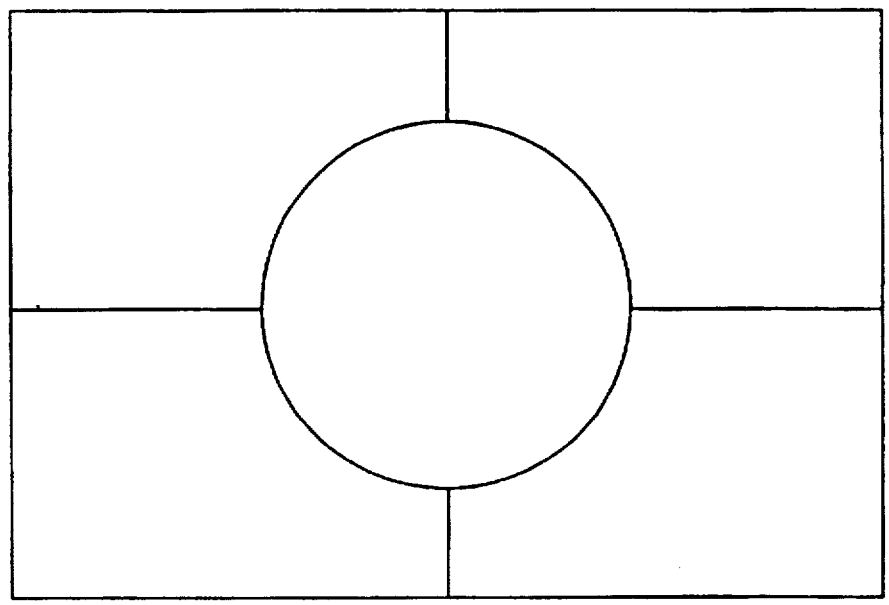
FIG. 12 is a diagram of a photometric unit shown in FIGS. 1 and 2.

FIG. 12 is an example of an application of the photometric unit 2 described in FIGS. 1 and 2. The photometric unit 2 performs viewfinder partitioned light photometry, and the light receiving elements of the photometer are similarly partitioned. The viewfinder screen 15, by using the photometric optical system of the photometric unit 2, is projected on the light receiving elements.

As has been described in FIG. 11, when the image blur suppression optical system 18b shifts, the amount of light incident on the light receiving elements changes. Furthermore, in the aforementioned similar light receiving elements capable of partitioned photometry, due to the asymmetry of the incident light angles, the way in which the amount of light, which is incident on each of the respective regions, changes is different.

In the case of having this kind of light receiving element capable of partitioned light photometry, five kinds of lens parameters of the photometric compensation function data used in the previously described S140, for the photometric regions (five in this example), respectively, may be stored. With respect to the compensation drive position, the parameters relating to five photometric compensation functions are set.

In the above embodiment, it is necessary for the lens control unit 5 to output (a maximum of) five kinds of parameters to the camera control unit 1, corresponding to the five places of photometric regions. However, the optical device, in the case of having more numerous photometric regions, is caused to make do with a smaller number of parameters than the number of photometric regions. The camera control unit 1, by performing an appropriate suppression process, may calculate the photometric compensation constants of each region.

For example, with regard to the focus detection device, in between region 31 and region 33 described in FIGS. 4 through 6, in cases such that the region 37 is taken as the focus detection pupil in common with these, the defocus compensation constant of this region 37 may be set as follows:

$$C\ 37\ (N,\ N') = \{C\ 31\ (N,\ N') + C\ 33\ (N,\ N')\}/2. \qquad \text{(Eq. 9)}$$

The defocus compensation constants, because they are set based upon the effects of aberration of the optical system with respect to the positions of the regions, are values of properties which change continuously, and may be found by this kind of interpolation process. If thus performed, the lens parameter memory unit 11 is not made large scale, and the lens control unit 5 causes a reduction of the communication process of the camera control unit 1.

Even if the camera body is changed to one with different focus detection regions, by calculating defocus compensation constants in the control unit of each camera body, consistency is good.

Furthermore, similarly to the parameters relating to the defocus compensation constants, the parameters relating to the photometric compensation constants are used, in the embodiment example used in the above description. The camera system is divided into a body part and a lens part, a respective body control unit 1 and a lens control unit 5 are positioned therein, but the present invention is not limited to this configuration. For example, in a camera system which is made wholly integral, the control units and memory units may be integrated. The focus drive unit 7 may be configured in the body side, mechanically coupled by coupling and the like to the lens side focus drive mechanism. In this case also, the lens state detection unit 8 which detects the positional situation of the photographic optical system 18 is preferably on the lens side.

Prior to the image blur suppression drive, the parameters necessary beforehand may be communicated, wholly or partially, from the lens parameter memory unit 11 to the camera control unit 1 (these parameters being stored temporarily in the camera control unit 1), at the time of the image blur suppression drive, and communication of simplified parameters from the lens control unit 5 to the camera control unit may be performed, wherein further calculations are performed in the camera control unit 1 such that the defocus compensation constants and the photometric compensation constants are calculated.

In the case that the lens of the optical device of the present invention is a zoom lens, in relation to the zoom position also, the lens state detection unit 8 is able to detect the zoom position of the lens. Then, the defocus compensation constant(s) and the photometric compensation constant(s) may use constant(s) which take into account the distance ring position and zoom position of the lens.

Furthermore, the optical device of the present invention has been described to be a camera with a lens unit as an interchangeable lens. However, the optical device of the present invention may also be binoculars or other optical measuring devices and the like, instead of a camera.

As described above, the constant generation unit provides constant(s) based upon the suppression position of the suppression optical system, to the photometric calculation unit, for photometric detection appropriate to its optical condition. As a result, the photographic optical system is capable of always calculating the accurate true photometric value, and an accurate photometric operation is possible based upon the state of the suppression optical system.

According to the present embodiment, the constant generation unit provides constant(s) based upon the suppression position of the suppression optical system to the focus detection calculation unit, for focus detection appropriate to its optical condition. As a result, the photographic optical system is capable of always calculating the accurate true defocus amount, and an accurate focusing operation is possible, based upon the state of the suppression optical system.

The present invention is applicable to cameras having plural focus detection regions, corresponding to even complicated changes of the defocus detection values according to the difference of the detection regions, and more accurate focusing operation is possible.

Furthermore, because the optical device partially makes common the necessary stored parameters, the design can be such that the memory is made small scale, and the cost is reduced.

As clearly set forth in the foregoing constants which denote changes in optical conditions, other than the defocus amount calculation can also be used for the correction of subject luminosity detected by the camera photometric unit.

The case of performing photometry suppression will next be described.

As described in the foregoing, the incident pupil point shifts due to the shift of the image blur suppression lens group, and photometric accuracy decreases.

The above-mentioned decrease of photometric accuracy may be dealt with in the following manner.

Firstly, photometric compensation coefficient data may also be stored in the lens parameter memory unit 11, corresponding to the change of the photometric value detected by the photometer unit 2 of the camera body due to the effect on photometry of the image blur suppression.

In the flow of the previously described FIG. 3, in S140, the camera control unit 1, based on the lens parameters of the detection data obtained from the photometric unit 2 in S130, and the photometric compensation coefficient data obtained in S120, performs calculations to find the true photometric value. The true photometric value of the subject can be calculated by this means.

Control of the exposure operation may be performed in S300 and below, based on the true photometric value obtained in this manner.

As described in detail hereinabove, the advantages of the present invention are that, because the constant generation unit generates constants which denote changes of its optical conditions based upon the suppression position of the suppression optical system, optical conditions due to changes of the suppression optical system can be compensated.

Moreover, because the constant generation unit generates constants for appropriate focus detection in these optical conditions, independently of the state of the photographic optical system and the suppression optical system and based upon the suppression position of the suppression optical system, the optical device is always able to calculate the true defocus amount, and it is possible to perform accurate focusing operations.

Further, because the constant generation unit generates constants for appropriate photometric detection, independently of the state of the suppression optical system, and based upon the suppression position of the suppression optical system, the optical device is always capable of performing accurate photometry.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical device, comprising:
   a photographic optical system to produce a photographic image and including a suppression optical system to suppress image blur of the photographic image;
   a suppression detection unit to detect changes in said suppression optical system during the suppression of the image blur; and
   a constant generation unit to generate constants representative of changes to optical conditions for producing the photographic image resulting from the changes detected by said suppression detection unit,
   wherein said optical device uses the constants to alter image taking conditions related to taking of a picture of the photographic image.

2. The optical device as claimed in claim 1, further comprising a data detection unit to detect characteristics of light passing through said photographic optical system, wherein said constant generating unit generates the constants to compensate the characteristics of the light detected by said data detection unit, to produce the photographic image.

3. The optical device as claimed in claim 2, further comprising a focus detection unit to detect a focus state of a subject image which has passed through said photographic optical system, wherein said constant generation unit generates the constants to correct the focus state detection of said focus detection unit.

4. The optical device as claimed in claim 3, wherein said focus detection unit has a plurality of focus detection regions and determines the focus states in each of said plurality of focus detection regions, and said constant generation unit generates different constants corresponding to each one of said plurality of focus detection regions.

5. The optical device as claimed in claim 3, wherein said focus detection unit has a plurality of focus detection regions and determines the focus states in each of said plurality of focus detection regions, and said constant generation unit generates some of the same constants and some different constants corresponding to said plurality of focus detection regions.

6. The optical device as claimed in claim 1, further comprising a constant memory unit to store the constants which represent the changes to the optical conditions resulting from the changes of said suppression optical system, wherein said constant generation unit selects the constants which have differed from among the stored values in said constant memory unit, based upon the changes detected by said suppression detection unit.

7. The optical device as claimed in claim 6, further comprising a memory unit to store plural constants representative of changes to optical conditions resulting from the changes of said suppression optical system, wherein said constant generation unit selects the plural constants which have differed from the stored values in said constant memory unit, based upon the changes detected by said suppression detection unit.

8. The optical device as claimed in claim 1, wherein the optical device is a camera system and further comprises:
   a body unit;
   a lens unit to be attached to said body unit, wherein said constant generation unit is situated in said lens unit; and
   a communication unit to transmit the constants from said constant generating unit to said body unit.

9. The optical device as claimed in claim 1, wherein the optical device is an interchangeable lens, said constant generation is situated in said lens unit and the optical device further comprises an output unit to output the constants from said constant generation unit to an exterior of the optical device.

10. The optical device as claimed in claim 6, further comprising:
    a body unit;
    a lens unit to be attached to said body unit, wherein said constant generation unit and said constant memory unit are situated in said lens unit; and
    a communication unit to transmit the constants from said constant generation unit to said body unit.

11. The optical device as claimed in claim 6, wherein the optical device is an interchangeable lens, said constant generation and said constant memory unit are situated in said lens unit and the optical device further comprises an output unit to output the constants from said constant generation unit to an exterior of the optical device.

12. The optical device as claimed in claim 1, wherein said constant generation unit generates the constants so as to have the same value, in a fellow position symmetrical between neutral points relating to changes in said suppression optical system.

13. The optical system as claimed in claim 7, wherein said memory unit is rewritable.

14. The optical system as claimed in claim 1, further comprising a suppression drive unit to drive said suppression optical system in two dimensions perpendicular to an optical axis of the optical device, wherein said constant generation unit selects the constants which have differed from the stored values in said constant memory unit, based upon the changes in position detected by said suppression detection unit in the two dimensions.

15. An optical device, comprising:
    a photographic optical system to produce a photographic image and including a suppression optical system to suppress image blur of the photographic image;

a suppression drive unit to drive said suppression optical system;

a suppression position detection unit to detect a drive position of said suppression optical system due to said suppression drive unit; and a constant generation unit to generate constants representative of changes to optical conditions for producing the photographic image resulting from the drive position detected by said suppression position detection unit, wherein said optical device uses the constants to alter image taking conditions related to taking of a picture of the photographic image.

16. The optical device as claimed in claim 15, wherein the optical device is a camera system further comprising a photometric unit to detect subject luminosity from subject light which has passed through said photographic optical system, and wherein said constant generation unit generates the constants relating to photometry of said photometric unit.

17. The optical device as claimed in claim 16, wherein said photometric unit has a plurality of photometric regions and determines the luminosity in each of said plurality of focus detection regions, and said constant generation unit generates different constants corresponding to each one of said plurality of photometric regions.

18. The optical device as claimed in claim 16, wherein said photometric unit has a plurality of photometric regions and determines the luminosity in each of said plurality of focus detection regions, and said constant generation unit generates some of the same constants and some different constants corresponding to said plurality of photometric regions.

19. A camera system, comprising:

a photographic optical system to produce a photographic image and including a suppression optical system to suppress image blur of the photographic image;

a suppression drive unit to drive said suppression optical system;

a suppression position detection unit to detect a drive position of said suppression optical system due to said suppression drive unit;

a focus detection unit to detect a focus state of subject light which has passed through said photographic optical system;

a photometric unit to detect subject luminosity from subject light which has passed through said photographic optical system; and a constant generation unit to generate constants representative of changes to optical conditions for producing the photographic image resulting from the drive position detected by said suppression position detection unit, wherein said constant generation unit generates first ones of the constants relating to the focus state detection of said focus detection unit and second ones of the constants relating to photometry of said photometric unit, and the optical device uses the constants to alter image taking conditions related to taking of a picture of the photographic image.

20. The camera system as claimed in claim 19, further comprising a memory unit to store the constants, wherein the first and second ones of the constants are selected from the stored values in said memory unit, based upon the drive positions detected by said suppression position detection unit.

21. The camera system as claimed in claim 19, further comprising:

a body unit;

a lens unit to be attached to said body unit, wherein said constant generation unit is situated in said lens unit; and a communication unit to transmit the constants from said constant generating unit to said body unit.

22. The camera system as claimed in claim 20, further comprising:

a body unit;

a lens unit to be attached to said body unit, wherein said constant generation unit and said memory unit are situated in said lens unit; and a communication unit to transmit the constants from said constant generation unit to said body unit.

23. The camera system as claimed in claim 20, wherein said memory unit is an EEPROM.

24. The camera system as claimed in claim 19, wherein said suppression drive unit drives said suppression optical system in two dimensions perpendicular to an optical axis of the optical device, wherein said constant generation unit selects the constants from the stored values in said memory unit, based upon the drive position detected by said suppression detection unit in the two dimensions.

* * * * *